United States Patent [19]
Popov

[11] Patent Number: 6,125,888
[45] Date of Patent: Oct. 3, 2000

[54] QUICK ACTING CLOSURE

[76] Inventor: Ivaylo Popov, Westendstrasse 69, D-63477 Maintal, Germany

[21] Appl. No.: 09/250,321

[22] Filed: Feb. 16, 1999

[30] Foreign Application Priority Data

Feb. 27, 1998 [AT] Austria .......................................... 355/98

[51] Int. Cl.$^7$ ...................................................... F16L 9/22
[52] U.S. Cl. ........................... 138/109; 138/155; 285/364; 285/365; 285/367; 285/368; 285/400; 285/407
[58] Field of Search ...................... 138/109, 155, 138/96 R; 285/364, 365, 366, 367, 368, 400, 407, 408, 411, 412, 415

[56] References Cited

U.S. PATENT DOCUMENTS

| | | | |
|---|---|---|---|
| 1,185,049 | 5/1916 | Best | 285/364 |
| 1,887,332 | 11/1932 | Shrum | 138/96 R |
| 2,239,307 | 4/1941 | Weber | 285/368 |
| 3,013,821 | 12/1961 | Bogan | 285/407 |
| 3,038,503 | 6/1962 | Dingledy | 138/155 |
| 3,044,479 | 7/1962 | Meyer et al. | 138/96 R |
| 3,046,938 | 7/1962 | Perkins | 138/155 |
| 3,642,307 | 2/1972 | Brickhouse et al. | 285/364 |
| 3,650,550 | 3/1972 | West | 138/109 |
| 4,157,146 | 6/1979 | Svenson . | |
| 4,234,019 | 11/1980 | Hornor et al. | 138/109 |
| 4,486,037 | 12/1984 | Shotbolt | 285/367 |
| 4,563,025 | 1/1986 | Poe | 285/367 |
| 4,627,646 | 12/1986 | Kessel | 285/365 |
| 4,635,970 | 1/1987 | Haines | 285/368 |
| 4,779,900 | 10/1988 | Shumard | 285/368 |
| 4,976,288 | 12/1990 | Steele et al. | 138/155 |
| 5,692,544 | 12/1997 | Friedrich et al. | 138/109 |
| 5,896,891 | 4/1999 | Dierwechter et al. | 138/109 |
| 5,908,210 | 6/1999 | Fetzer | 285/367 |

*Primary Examiner*—James Hook
*Attorney, Agent, or Firm*—Notaro & Michaelos P.C.

[57] ABSTRACT

A a quick acting closure has two flanges. One of the two flanges has a groove for a flexible seal and the other has spaced cogs. The goal is to provide a quick acting closure in such a form that it can be used for the connection/closure of boiler or pipeline elements which can either have a round or a non-round cross section. In accordance with the invention, the two flanges are therefore connected to each other by individual clamps which are arranged at the circumference of the flanges and the number of which is equal to the number and the spacing of the cogs in the flange whereby the clamps are connected to each other two sheet rings, i.e. one lower and one upper sheet ring.

5 Claims, 5 Drawing Sheets

QUICK ACTING CLOSURE

FIELD AND BACKGROUND OF THE INVENTION

The invention consists of a quick acting closure which serves in machine and plant construction for the connection of boiler or pipeline parts in which a medium pressure prevails which differs from the ambient medium pressure.

In practice, so-called bayonet catches are known which consist of a lower and an upper flange whereby in one of the two flanges cogs have been cut out in a certain spacings. A groove with a flexible seal is also provided in one of the two flanges. The two flanges are round and hermetically connected to each other by means of a monolithic ring formed of a rolled and milled sheet whereby this ring has cogs at the inside which have been produced in the same spacing as in the flange.

A major disadvantage is the limited application of this type of quick acting closures because they can only be used for the connection/closure of boiler or pipeline elements with a round cross section. The connection of pressure vessel or pipeline elements of another cross section, as for example elliptic or oval, is not possible. An additional disadvantage of this design is the monolithic bayonet ring, the manufacture of which is possible only with increased effort which unfavourably influences the technological characteristics of the total connection.

SUMMARY OF THE INVENTION

The invention's task is to create a quick acting closure which can also be used for the connection/closure of boiler or pipeline elements which either have a round or a non-round, e.g. elliptic or oval, cross section whereby the design of the connection is simple and can technologically be easily produced so that the application range of the closure can be extended.

This task is solved by a quick acting closure which consists of two flanges whereby a groove for an elastic seal is provided in one of the two flanges and one of the two flanges is equipped with cogs at a certain spacing. According to the invention, the two flanges are hermetically connected to each other by means of individual clamps which are arranged at the circumference of the flanges and the number of which is equal to the number and the spacing of the cogs in the flange. The clamps are connected to each other by means of two sheet rings, one lower and one upper sheet ring. In another model of the invention the flanges have an unround form, e.g. elliptic or oval, and the clamps are connected to each other by means of lower and upper segments and cylindrical joints.

An advantage of the invention is the extended range of application since this design makes the gas-tight connection of not only round but also of non-round, e.g. oval or elliptic parts of pressure vessels or pipelines possible. Another advantage of the invention is the improved, under manufacturing aspects more simple design of the closure because the production of the individual clamps and of the sheet rings connecting them or of segments and joints is much more easily realizable with simpler production means than the production of a monolithic bayonet ring.

BRIEF DESCRIPTION OF THE DRAWINGS

The invention includes various different embodiments, two of them being purely diagrammatically shown in the attached drawings, whereby.

DETAILED DESCRIPTION

Figure 1:
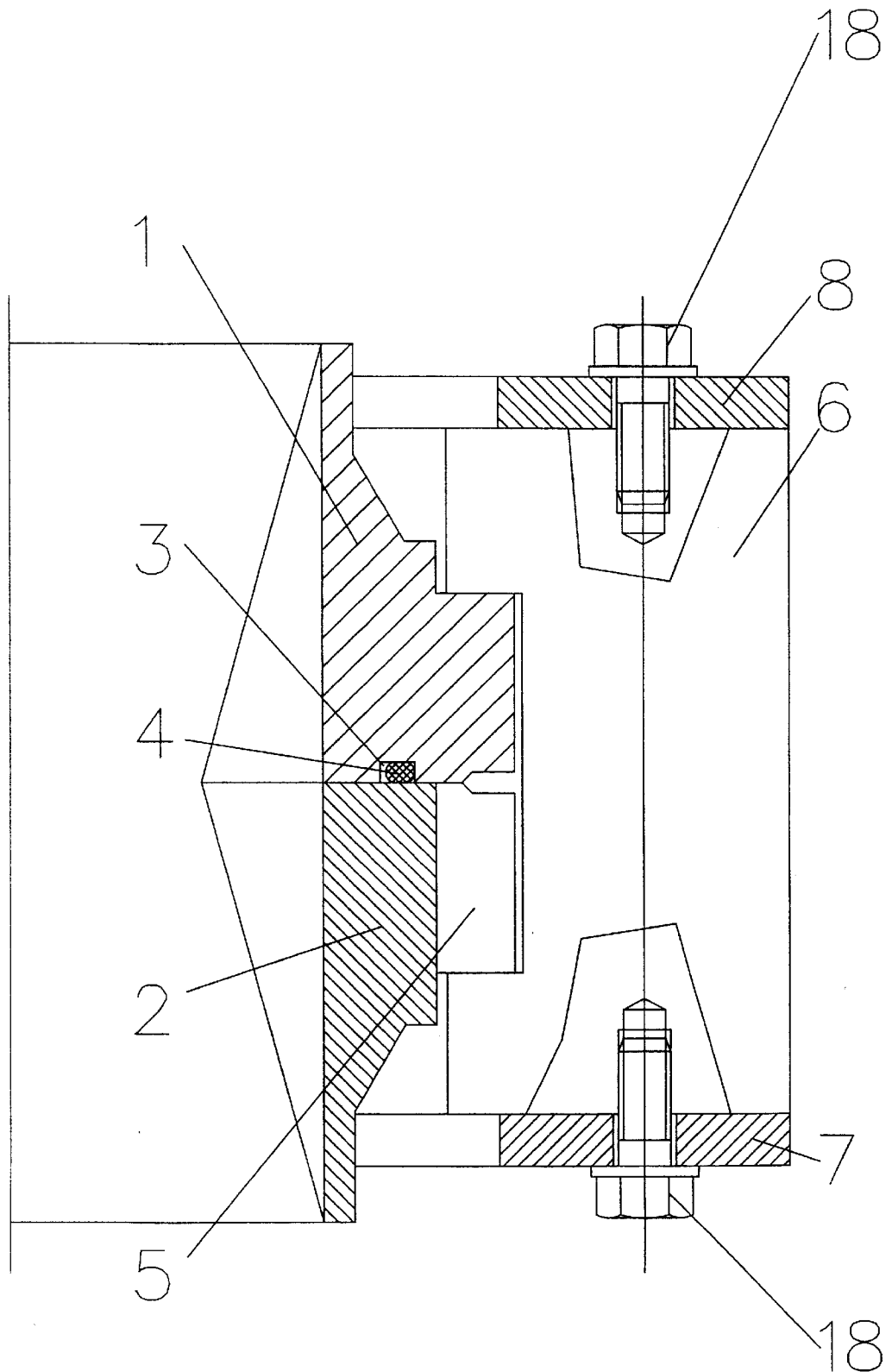
FIG. 1 is the section A—A of FIG. 2 through the clamp of a round closure.
Figure 2:
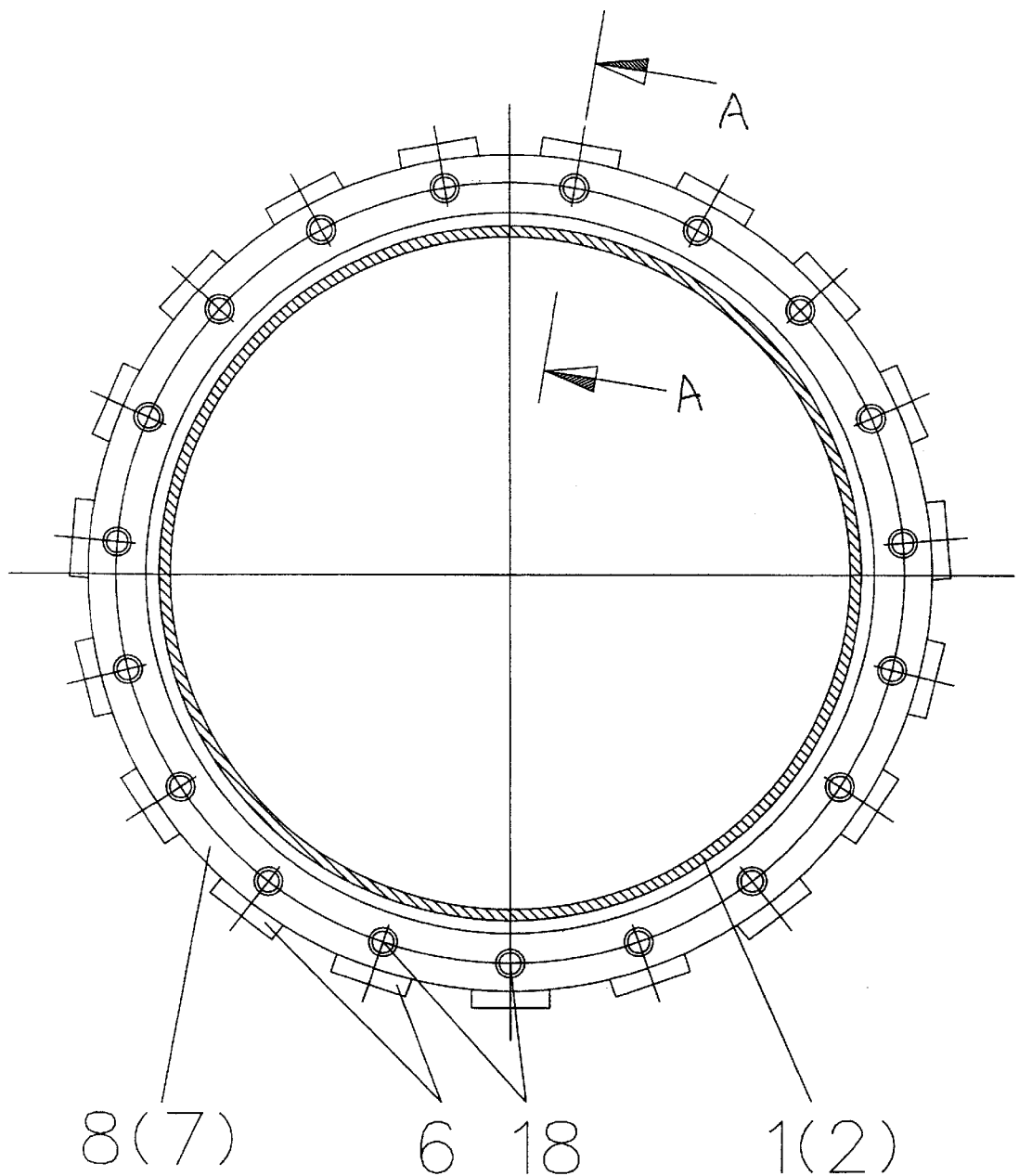
FIG. 2 is the vertical view of a round closure.
Figure 3:
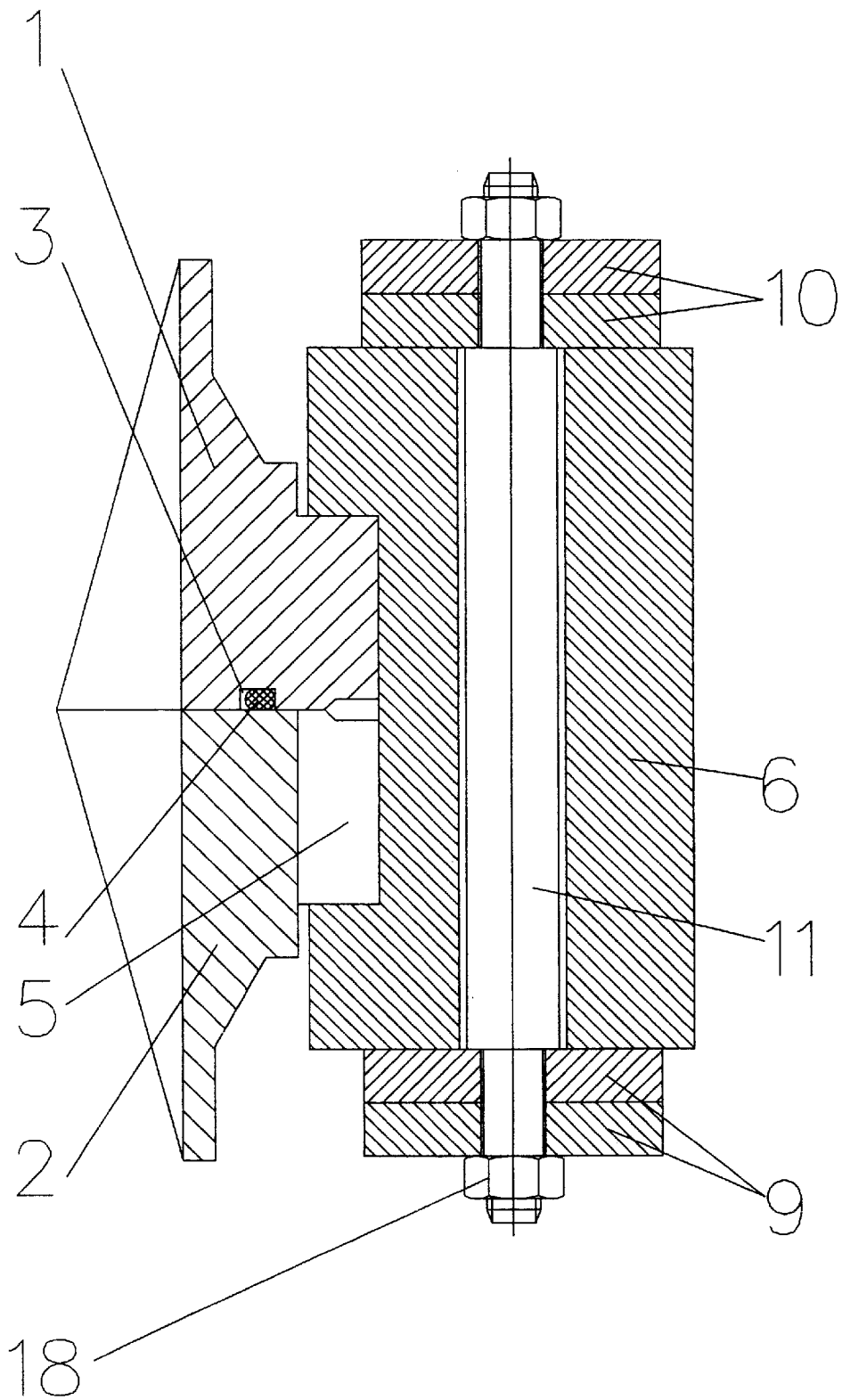
FIG. 3 is the section B—B of FIG. 4 through the joint level of the closure with oval cross section.
Figure 4:
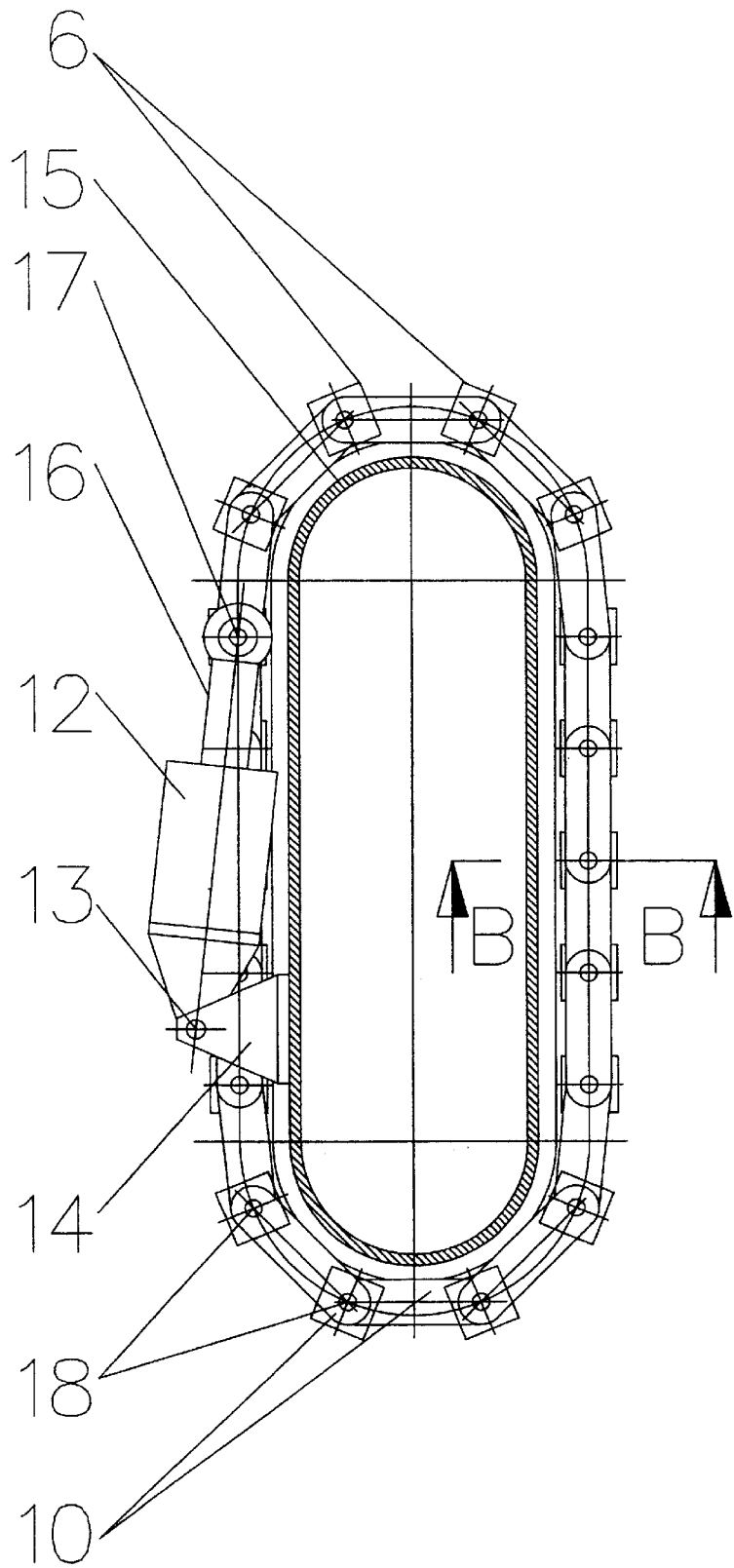
FIG. 4 is a vertical section of a closure with oval cross section.
Figure 5:
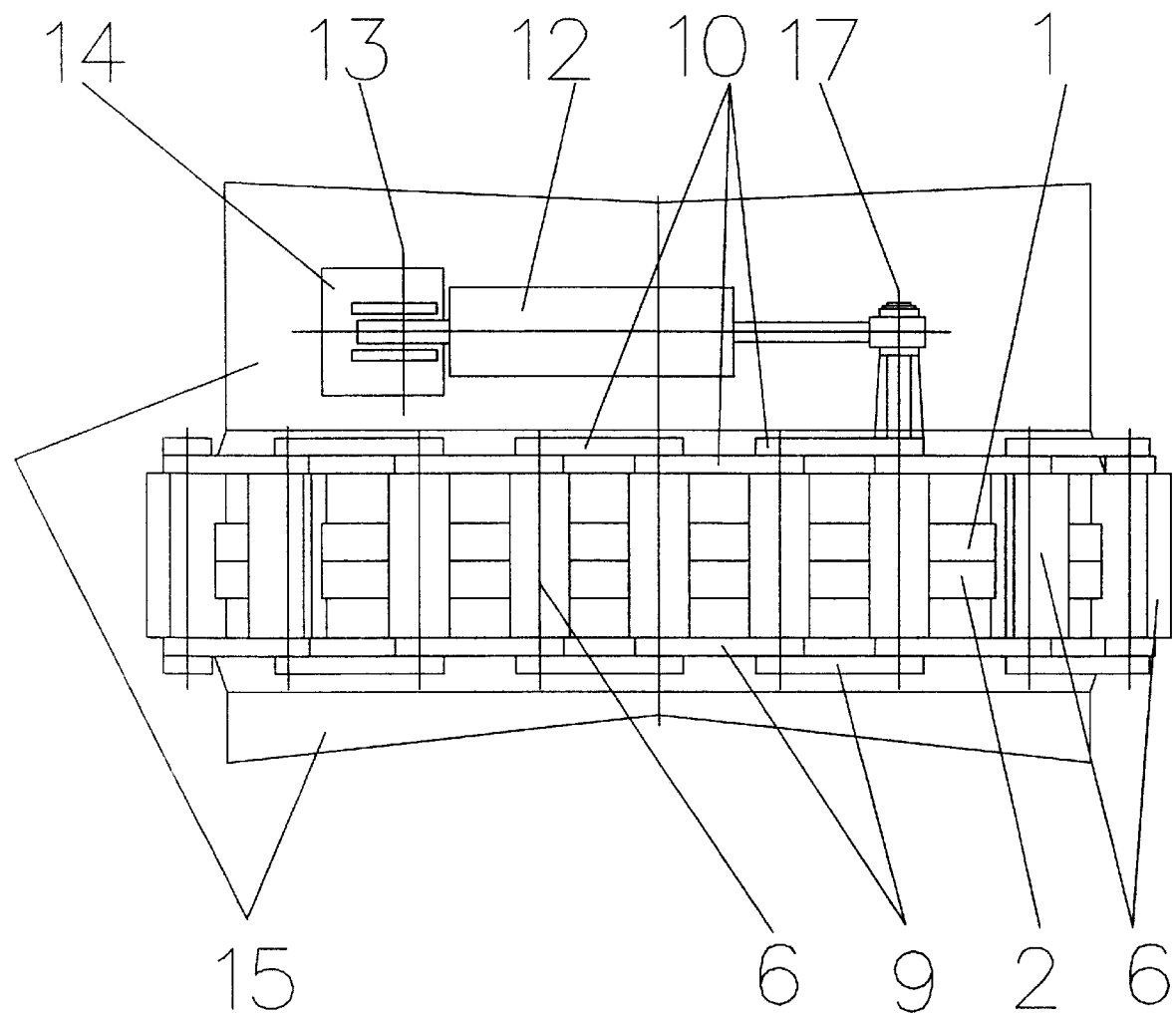
FIG. 5 a side-view of the closure.

The quick acting closure mainly consists of flanges 1 and 2, whereby a groove 3 is provided for an elastic seal 4 in flange 1 and flange 2 is equipped with cogs 5. The two flanges are connected to each other by means of individual clamps 6 which are arranged at the circumference of the flanges 1 and 2 and the number of which equals the number and the spacing of the cogs 5 in flange 2. The clamps 6 are connected to each other by means of two sheet rings, i.e. one lower sheet ring 7 and one upper sheet ring 8, and bolt connections 18. In another modes of the invention, the flanges 1 and 2 have a non-round form, e.g. elliptic or oval, and the clamps 6 are connected to each other by means of lower segments 9 and upper segments 10, cylindrical joints 11, and bolt connections 18. As drive element of the clamping ring, a hydraulic cylinder 12 is provided which is connected by means of bolts 13 and a bracket 14 with a stationary part of the boiler 15 and a piston rod 16 which is connected to the clamping ring by means of the extended bolt 17 of the cylindrical joint 11. By operating the hydraulic cylinder 12 in one or the other direction, the clamps 6 are shifted around the symmetry-axis of the flanges 1 and 2 by one spacing so that the position of the clamps 6 at the driven-out cylinder 12 is in conformity with the position of the cogs—closure locked—or in the other direction-driven-in hydraulic cylinder 12—the position of the clamps 6 is in conformity with the cog-spacing—closure open. The two parts of the boiler 15 can be separated from one another.

What is claimed is:

1. A quick acting connector for connecting two flanges to each other, comprising:

one of the two flanges having a groove therein in a surface of the one flange adapted to face a surface of the other of the two flanges;

an elastic seal in the groove for engaging against the surface of the other flange;

a plurality of cogs extending from one of the two flanges, the cogs being spaced from each other around the circumference of the one flange;

a plurality of clamps arranged around the circumference of the flanges, the clamps being in a number and spacing which is equal to the number and spacing of the cogs, each clamp being engaged with one cog and a portion of the other of the two flanges for holding the two flanges together;

a first ring arrangement on one side of the plurality of clamps;

a second ring arrangement on an opposite side of the plurality of clamps; and a plurality of connectors connecting the first and second ring arrangements to the clamps for holding the clamps into engagement with the cogs and with the other of the two flanges.

2. A quick acting connector according to claim 1, wherein each of the first and second ring arrangements comprise a sheet ring.

3. A quick acting closure according to claim 1, wherein each of the first and second ring arrangements comprises a plurality of segments which are connected together around the circumference of the flanges.

4. A quick acting closure according to claim 3 including hydraulic joint means for acting on the connected segments for urging the clamps against the cogs.

5. An arrangement according to claim 4 wherein the connected segments form a non-round shape around the circumference of the flanges, the flanges having a non-round shape.

* * * * *